United States Patent
Ried

(10) Patent No.: US 7,462,288 B2
(45) Date of Patent: Dec. 9, 2008

(54) OZONE/UV COMBINATION FOR THE DECOMPOSITION OF ENDOCRINE SUBSTANCES

(75) Inventor: Achim Ried, Bad Oeynhausen (DE)

(73) Assignee: Wedeco AG Water Technology, Dusseldorf (DE)

( * ) Notice: Subject to any disclaimer, the term of this patent is extended or adjusted under 35 U.S.C. 154(b) by 0 days.

(21) Appl. No.: 11/787,594

(22) Filed: Apr. 17, 2007

(65) Prior Publication Data
US 2007/0193957 A1 Aug. 23, 2007

Related U.S. Application Data

(62) Division of application No. 10/432,538, filed on May 22, 2003.

(30) Foreign Application Priority Data
Sep. 10, 2001 (DE) ................ 101 44 510

(51) Int. Cl.
C02F 1/32 (2006.01)
(52) U.S. Cl. ..................... 210/748
(58) Field of Classification Search ............ 210/748, 210/188
See application file for complete search history.

(56) References Cited

U.S. PATENT DOCUMENTS

| 4,792,407 A | 12/1988 | Zeff et al. |
| 5,178,755 A | 1/1993 | LaCrosse |
| 5,217,607 A | 6/1993 | Dalton et al. |
| 5,302,298 A * | 4/1994 | Leitzke ................ 210/748 |
| 5,470,461 A * | 11/1995 | Ban et al. ............. 210/188 |
| 5,554,295 A | 9/1996 | Ban et al. |
| 5,679,257 A | 10/1997 | Coate et al. |
| 5,989,427 A | 11/1999 | Ellard et al. |
| 6,214,240 B1 | 4/2001 | Yasunaga et al. |

FOREIGN PATENT DOCUMENTS

| DE | 26 18 338 | 11/1976 |
| DE | 26 18 338 | 11/1976 |
| DE | 39 21 436 | 1/1991 |

(Continued)

OTHER PUBLICATIONS

Katsuki Kusakabe et al., "Decomposition of Humic Acid and Reduction of Trihalomethane Formation Potential in Water by Ozone with U.V. Irradiation", Water Research, Elsevier Science, Jun. 1, 1990, pp. 781-785, vol. 24, No. 6, Amsterdam, NL.

(Continued)

Primary Examiner—Walter D. Griffin
Assistant Examiner—Cameron J Allen
(74) Attorney, Agent, or Firm—RatnerPrestia

(57) ABSTRACT

The invention relates to a method for treating water, especially waste water and drinking water, containing both pathogenic germs and a substance which is difficult to decompose and is from the group comprising persistent substances, endocrine substances, odorous substances, and dyestuffs, by means of ozone supply and UV radiation. The inventive method comprises the following steps: a) ozone is supplied in a concentration of between 0.1 g/m3 and 15 g/m3; and b) UV rays are radiated in a wavelength range of between 200 nm and 300 nm and in a dose of between 50 J/m2 and 2,000 J/m2.

13 Claims, 2 Drawing Sheets

FOREIGN PATENT DOCUMENTS

| | | |
|---|---|---|
| DE | 39 21 436 A1 | 1/1991 |
| DE | 195 09 066 | 9/1996 |
| DE | 195 09 066 A1 | 9/1996 |
| DE | 198 01 867 | 7/1999 |
| DE | 198 01 867 A1 | 7/1999 |
| DE | 38 84 808 T2 | 9/2004 |
| EP | 0 373 268 B1 | 6/1990 |
| EP | 0 696 258 | 8/2000 |
| EP | 0 696 258 B1 | 8/2000 |
| GB | 1 543 225 | 3/1979 |
| JP | 04 141 296 | 5/1992 |
| JP | 04141296 A | 5/1992 |
| JP | 11-042486 * | 2/1999 |
| JP | 2001 129 572 | 5/2001 |
| JP | 2001-129572 | 5/2001 |
| WO | WO 94/11307 | 5/1994 |
| WO | WO 97/36825 | 10/1997 |

OTHER PUBLICATIONS

Egberts, G., "Abbau Von Ozon In Waessriger Loesung Durch UV-Strahlung", GWF Wasser Abwasser, Oldenbourg Verlag, Aug. 1, 2994, pp. 465-469, vol. 135, No. 8, Munchen, DE.

Rudolph K. et al., "Stand Der Technik Bei Der Desinfektion Von Abwasser Und Schwerpunkte Der Forschung", GWF Wasser Abwasser, Oldenbourg Verlag, Jan. 1993, pp. 1-9, vol. 134, No. 1, Munchen, DE.

International Search Report corresponding to PCT/EP02/10083 dated Dec. 27, 2002.

* cited by examiner

OZONE/UV COMBINATION FOR THE DECOMPOSITION OF ENDOCRINE SUBSTANCES

This application is a divisional of U.S. application Ser. No. 10/432,538 filed May 22, 2003.

FIELD OF THE INVENTION

The present invention relates to a method for treating water, in particular waste water or drinking water.

BACKGROUND OF THE INVENTION

Municipal and industrial waste waters are normally treated in biological treatment plants before they are introduced into a receiving body. The biological treatment plant may consist of several stages, wherein the main stage in most cases incorporates a so-called activated sludge stage. The sewage sludge is separated in a post-treatment stage. Provision may also be made for the waste water to be subjected to sand/gravel filtration. The waste waters treated thus generally attain the required limit values in terms of the concentration of the residues and microorganisms contained in them.

However, there are cases in which the waste water treatment described is insufficient, for instance if greater demands are imposed with regard to germ count, loading with difficultly degradable organic substances, odour and colour. For example, further treatment is required when the waste water treated is to be introduced to bathing water or is to be used for irrigation purposes in agriculture.

It is now common practice to provide for disinfection of the waste water with UV radiation to reduce only the pathogenic microorganisms contained in the waste water (bacteria, viruses, single-celled organisms). However, this disinfection is not suitable for removing difficultly degradable organic substances, odorous substances and dyes. Moreover, the disinfecting capacity of the UV irradiation devices is reduced if the waste water is turbid because some of the radiation is already absorbed in the water itself.

Furthermore, disinfectants with ozone addition are known which also reduce the difficultly degradable substances, odorous substances and dyes mentioned by oxidation. However, a relatively high ozone concentration, e.g. 20 mg of ozone per liter, is required to achieve the reduction of both the difficultly degradable substances and the microorganisms aimed for. This ozone addition is associated with high investment and operating costs.

A third possibility method of effective waste water treatment is membrane filtration, which again is many times more expensive than ozone treatment, in terms of investment and operating costs, under the conditions described above.

Similar situations are also conceivable in the case of other waters, drinking water for example. If difficultly degradable substances such as chlorinated hydrocarbons or aromatic hydrocarbons are contained in the drinking water, in addition to a concentration of microorganisms that requires treatment, low cost effective UV disinfection is insufficient to degrade these substances. In such situations ozone addition has been installed of UV disinfection, giving rise to the higher costs mentioned.

Various methods for treating waste waters with ozone and UV are also known from the following publications:

EP 0696258 shows a water treatment unit in which ultraviolet light is used for the disinfection. Here, the light source is designed so that every very short wave radiation is able to enter the water and ozone is formed there in the immediate vicinity of the UV source. The expected ozone concentrations are low and lie in the mg/m3 range. In air with approximately 40 kWh/kg of ozone, the energy expenditure for ozone production by UV radiation is higher than when generating ozone with electrical discharge, which requires approximately 7 kWh/kg of ozone. Direct ozone generation in water by means of UV has an even lower efficiency than in air. The device is therefore unsuitable from the point of energy expenditure and for use in municipal treatment plants or drinking water supply plants.

A similar device is known from WO 97/36825. Here too, ozone is generated within the concentration range of a few mg/m3 by a photochemical process by means of ultraviolet radiation. As far as ozone production is concerned, this plant cannot be operated economically on the scale of municipal plants either.

A device for oxidising organic constituents in aqueous media is known from the German Offenlegungsschrift DE 2618338. In this plant, the object of the method is the complete oxidation of the organic substances, for which a very high ozone concentration is used, e.g. in the range of 860 g/m3. The aqueous media are treated by ozone in several baths, connected one behind the other, through which the ozone is conducted in the counterflow. In the last bath provision is made, in one embodiment of the invention, for an additional UV irradiation which reinforces the oxidation effect.

The action of the UV light is not used to the optimum degree in this configuration since the UV radiation is absorbed more effectively in the presence of gas bubbles resulting from the introduction of ozone than in a gas-free medium. Moreover, the ozone can be degraded even on a molecular basis in the high concentration indicated by UV light so that it is present in the later stages in a lower concentration than would be the case without UV irradiation. The degradation of ozone by irradiation with UV light in the aqueous phase can be intentionally used to activate ozone (conversion to radicals). These radicals will then effect a faster, further decomposition. However, in the actual waste water, the effect (improved degradation due to radical reactions) is superimposed by secondary reactions. This system is therefore also disadvantageous as far as the optimum action of ozone and UV is concerned, and is unsuitable for economic, large-scale operation.

A device and a method for the ozone treatment of water are known from DE 19509066 A1. No ozone concentration in the water is indicated in this method. At the outlet of the ozone treatment, UV radiators are provided which are designed to degrade any residual content of ozone in the water. Degasification of the treated water takes place in the direction of flow behind the UV irradiation. Here too, the UV irradiation cannot attain its full effect because the water still contains gas bubbles at the time of irradiation.

A method for oxidising organic substances in the water, operating on the basis of concentrations of a few 100 g/m3 of ozone, simultaneous addition of H2O2 and simultaneous irradiation with UV radiators, is known from DE 3884808 T2. Even in these methods, the UV radiation cannot attain the maximum effect because the water is irradiated during the ozone treatment. As mentioned above, this results on the one hand in premature ozone degradation due to the action of radiation and on the other hand in a reduction in UV transmission due to the gas contained in the water in the form of bubbles. Here, the various chemical-physical processes (ozone reactions, activated ozone reaction with H2O2/activated ozone reaction with UV) are used simultaneously, where the efficiency of each individual process is not used to the optimum degree and is even reduced by secondary and cross reactions.

Finally, a method is known from WO 94/11307 in which the waste water is sprayed into a landfill in a treatment chamber under the action of ozone and UV. This method is very expensive because the waste water has to be pumped and sprayed under pressure. The effectiveness, in terms of the efficiency of the energy expended, is relatively small because not only is it expensive to pump and spray the waste water to be treated, but the UV radiation is not used to the optimum degree. Because of the high energy expenditure such a method is not economically suitable for highly contaminated waste waters.

SUMMARY OF THE INVENTION

It is therefore the object of this invention to indicate a method for the treatment of waters which are loaded both with difficultly degradable substances and with pathogenic microorganisms, in which a good, reliable treatment capacity is possible at lower investment and operating costs.

This object is achieved by a method with the features of claim 1.

In the method according to the invention, provision is made for both supplying the water to be treated with ozone and carrying out UV irradiation. According to the invention, the ozone concentration to be supplied lies within a range of 0.1 g/m3 to 15 g/m3, and the dose of the UV radiation applied lies within a range of 50 J/m2 to 200 J/m2, where the wavelength of the UV radiation lies within a range of 200 nm to 300 nm. To allow both reactions to take place independently, thereby improving the efficiency of the energy used for ozone and UV production, provision is made for degasifying the water to be treated between the two stages.

With this method, even highly contaminated waste waters can be treated, the difficultly degradable substances being largely decomposed and the number of pathogenic germs in the water being reduced.

Compared with the methods not so far used in combination, this method provides the advantage over UV irradiation alone in that the difficultly degradable substances, odorous substances and dyes are also reduced. This is not possible with pure UV irradiation.

Compared with merely adding ozone to degrade the persistent substances mentioned and to carry out disinfection, it is the case that a reduction of the persistent substances, odorous substances and dyes can already be achieved with ozone concentrations which would not be sufficient for the disinfection of waters highly contaminated by microorganisms or waste waters. The series connected UV irradiation compensates for the smaller disinfecting action of the reduced ozone concentration.

The addition of ozone is preferably carried out at a concentration of 5 to 10 g/m3. The wavelength used for the UV irradiation should preferably be 254 nm and is generated with mercury low pressure gas discharge radiators. The UV irradiation dose should preferably be 100 to 1000 J/m2, in particular 250 to 400 J/m2.

The UV irradiation dose should preferably be 100 to 1000 J/m2, in particular 250 to 400 J/m2.

The method so far described is used to advantage mainly for reducing endocrinal substances in drinking water or waste water.

Here, it is also of particular advantage if provision is made for a filter stage, for example a sand/gravel filtration, between the ozone addition and UV irradiation. The filter stage may also exhibit other adsorptive filters, e.g. an activated carbon filter.

The method is particularly advantageous for use in waters which exhibit a reduced UV transmission of less than 50% in the relevant UV wavelength range of around 254 nm before the ozone addition stage of the method. Here, the transmission at 254 nm in distilled water is defined as 100%.

Moreover, the present invention relates to a device for implementing the method according to one of the preceding claims, in which the following features are provided:

a feed for pretreated waste water;

an ozone production device with a dosing device which feeds the ozone downstream of the feed into the water;

a degasifying device;

a UV disinfection device and an outlet arranged downstream from the feed-in.

BRIEF DESCRIPTION OF THE DRAWINGS

An embodiment of this invention is described in the following with reference to the drawing.

DETAILED DESCRIPTION OF THE INVENTION

The method according to the invention can be carried out advantageously with this device. Because the ozone production device, more precisely the dosing of ozone to the waste water flow, takes place upstream from the UV disinfection device, the ozone can initially improve the UV transmission of the waste water to be treated due to oxidative degradation of the dyes or opacifiers, and the UV disinfection device can therefore operate more efficiently due to the improved transparency of the waste water. Here, the degasifying device may be designed passively, for example as a basin or tank without ozone feed, the excess gas being absorbed or driven off within the holding time. Active degasification by means an agitator, vacuum or the like, may also be provided.

Compared with devices which do not exhibit ozone dosing and UV disinfection in this combination, the device can be operated at lower installation costs and lower operating costs.

The advantageous effect of the combination of ozone feed and UV disinfection is further reinforced if a filtration, in particular a sand filtration, or a sand/gravel filtration, is provided between these two stages. Because of the oxidative degradation of the difficultly degradable substances, these are partially converted to products of degradation which may be retained effectively by a filtration system. This measure improves both the quality of the water, in terms of the concentration of products of degradation, and the transparency of the water in the UV range that is of advantage to the subsequent UV disinfection, where the UV system can be operated more efficiently at the same time as the ozone pre-treatment because of the better transmission.

According to the invention, provision is also made for the use of a device described above for reducing the content of endocrinal substances in drinking water or waste water. The endocrinal substances are in this case selected from the group that includes the following:

chlorophenols phthalates pesticides phenols
chlorinated aromatics
organotin compounds
dioxins
furans
natural or nature-identical hormones
medicines
cosmetics.

Figure 1:
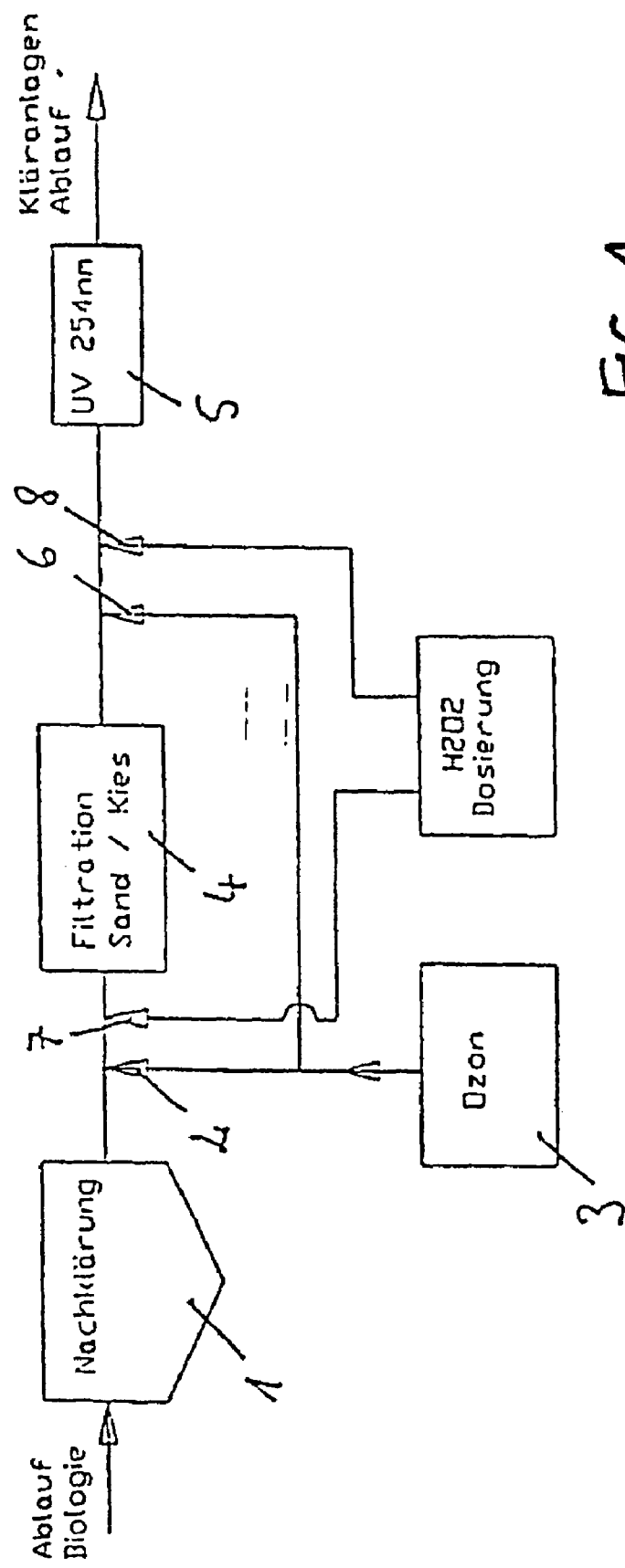
FIG. 1 shows: a device for implementing the method according to the invention in the waste water area in a diagrammatic representation.

FIG. 1 shows in a block diagram the structure of a water treatment device according to the invention and of a device for implementing the method according to the invention, as connected in series to a conventional treatment plant. The plant draws water from an outlet of the biological treatment system in an activated sludge stage of a treatment plant. This outlet is subject to post-treatment 1. The post-treated waste water, which contains an impermissibly high concentration of both persistent substances and pathogenic microorganisms, leaves the post-treatment system and must not be introduced into bath waters or used for irrigating agricultural areas. A feed 2 from an ozone generator 3 is therefore provided downstream from post-treatment 1. Here, the feed takes place at a concentration of approximately 5 g of ozone per m3 of water. This concentration is suitable for reducing the persistent substances, odorous substances and dyes and for improving the transmission of the waste water in the UV range. However, it is not suitable for reducing the number of pathogenic microorganisms to the intended level.

A sand/gravel filtration 4 is connected in series to ozone feed 2, in the flow of the waste water. In this filtration system, particles are again removed from the waste water flow, as are products of degradation of persistent substances which are subject to oxidative degradation because of the ozone feed. A UV disinfection device 5, which gives off a dose of approximately 250 to 400 J/m2 with a number of low pressure UV radiators in the 254 nm wavelength range, is provided behind the sand/gravel filtration.

After the UV disinfection stage, the waste water can be released without difficulty into a treatment plant outlet and hence into the atmosphere. The persistent substances and microorganisms previously contained in the waste water have been effectively reduced by the ozone feed and UV irradiation.

In addition, a second feed point 6 is provided in this embodiment for ozone after the sand/gravel filtration 4, which allows the possible post-treatment of substances or microorganisms which are able to penetrate filtration system 4.

As a further option, provision is made in this embodiment for allowing a H2O2 dosing at feed points 7 before filtration 4 and 8 after filtration 4. The H2O2 can be fed to improve the action of the ozone if very difficultly degradable substances are present. This applies, for example, to saturated hydrocarbon compounds.

Figure 2:
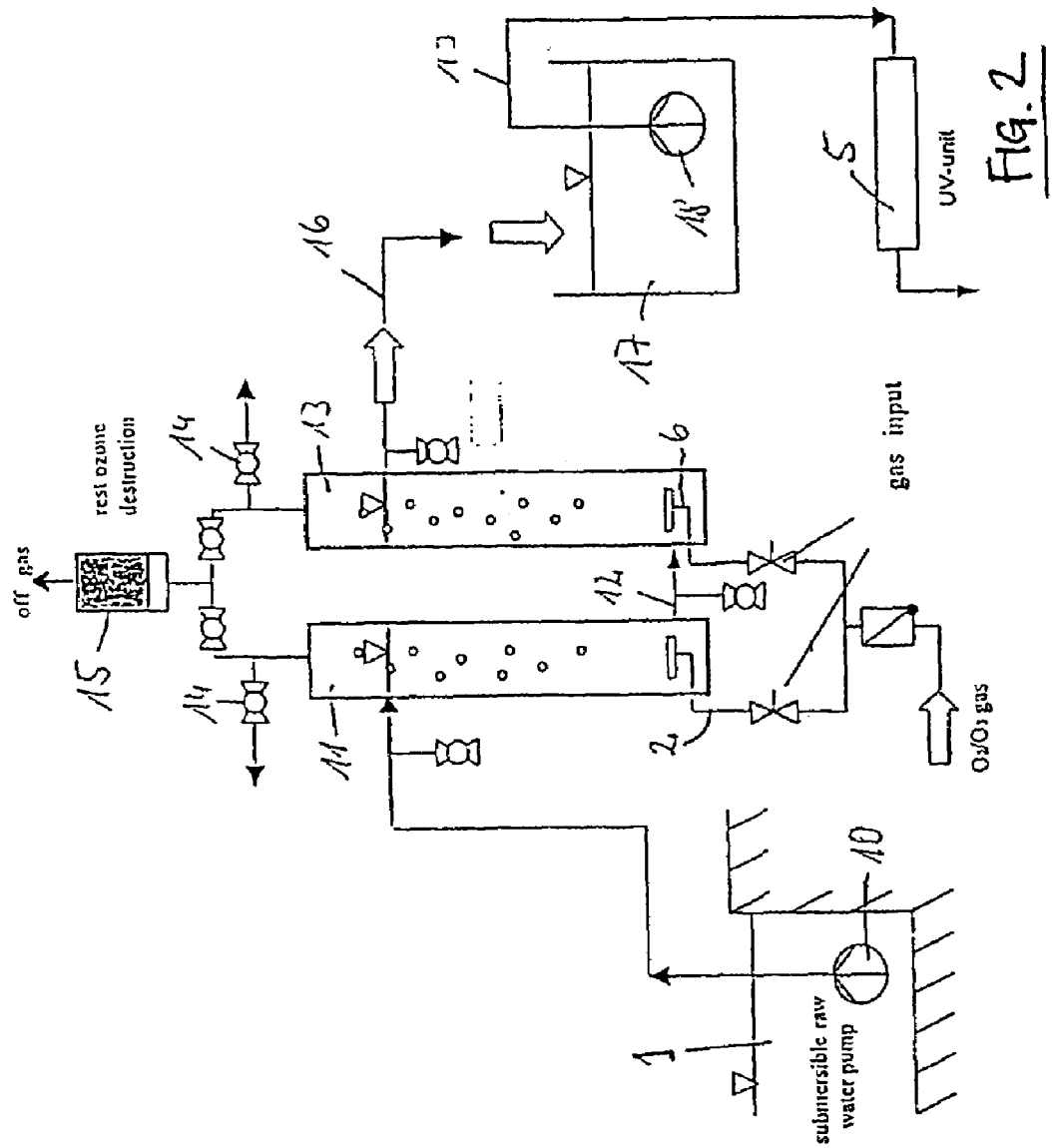
FIG. 2 shows: a device according to FIG. 1 with two-stage ozone treatment in a block diagram.

FIG. 2 shows a plant which is designed for treating waste water from municipal treatment plants with two-stage ozone treatment.

In particular, FIG. 2 shows post-treatment 1, in which is arranged a pump 10 for the water to be treated. Pump 10 feeds the water into a first treatment chamber 11, into which ozone is introduced from below via feed 2. The ozone rises in the form of gas bubbles, whilst the water to be treated is released downwards into a connecting pipe 12 in the counterflow. The preheated water is fed from connecting pipe 12 into a second treatment chamber 30, into which ozone is again fed via feed 6. The gas containing ozone, escaping at the top of chambers 11 and 13, is released either through valves 14 or through a device for degrading residual ozone 15 according to the residual concentration. The waste water that is now treated in two stages with ozone is fed through a pipe 16 into a degasifying device 17, which in this embodiment is designed as a storage tank. Here, any remaining gas bubbles are separated. The degasified water is then fed via a pump 18 and pipe 19 into UV irradiation device 5. Here, the UV radiation can act optimally with a wavelength of approx. 254 nm since any turbidity of the waste water is greatly reduced after the two-stage ozone treatment in chambers 11 and 13, and also because no residual gas bubbles are present in the water that would obstruct the UV transmission. On the other hand, UV irradiation unit 5 spatially separated from treatment chambers 11 and 13 is not capable of destroying the ozone fed into treatment chambers 11 and 13, enabling the ozone in these chambers to exert its full action. This is particularly important at the concentration values of 1-20 g/m3 of water aimed for. The ozone is used to the optimum degree without simultaneous activation reactions, which cannot be used specifically, particularly in the waste water. The ozone fed in generally reacts in the desired manner (destruction of the organic components), and the waste water thus pretreated undergoes final treatment essentially free of gas bubbles and without residual ozone in the UV system. If the ozone fed in does not react completely, the remaining dissolved ozone (without gas bubbles) can be further activated in the UV system.

The method and device according to this invention is optimised in terms of efficient use of the energy expended for the ozone production and UV radiation since the ozone is able to exert its action without the disadvantageous effects of the UV radiation for the ozone. Relatively low ozone concentrations are therefore obtained. On the other hand, the UV radiation can be used particularly effectively in the absence of turbidity and gas bubbles since the transmission is considerably improved at the point of UV treatment.

This generally provides a method and device for treating contaminated water which are optimised in terms of the use of the energy expended and which are therefore especially suitable for large-scale processing plants, for example in the area of municipal waste water.

The advantageous effect of the combination of ozone feed and UV irradiation at the concentrations and intensities indicated is due to the fact that the combined methods are improved in terms of their effect. At a much lower concentration than the 20 g/m3 generally used, the ozone effects a substantial degradation of the persistent substances, odorous substances and dyes. Moreover, even at the low concentration indicated the ozone gives an improvement in UV transparency. UV irradiation alone is insufficient to degrade persistent substances. However, water which has already been treated with ozone, and which may still contain microorganisms because of the low concentration of ozone introduced, is reliably disinfected. In this case, the UV radiation output can often be reduced compared to water not treated with ozone because the transmission is improved. This therefore gives rise to a synergistic effect which enables the plant to be designed with generally smaller dimensions than would be possible with pure ozone or UV treatment. In addition to the technical advantages, this effect also renders the plant of interest economically. Examples (If applicable).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. Method for the treatment of water in the simultaneous presence of
   pathogenic germs on the one hand, and
   on the other hand at least one difficultly degradable substance from the group containing the following: persistent substances, endocrinal substances, odorous substances, dyes,
   in particular the treatment of waste water or drinking water, with ozone supply and UV irradiation, with the following method stages:
   a) Addition of ozone in a concentration of 0.1 g/m$^3$ to 15 g/m$^3$;
   b) Degasification of and removal of residual ozone from the water;
   c) Irradiation of the degasified and residual ozone-free water with UV radiation in a wavelength ranging from 200 nm to 300 nm, and in a dose ranging from 50 J/m$^2$ to 2,000 J/m$^2$.

2. The method according to claim 1, wherein the addition of ozone takes place in a concentration of 2.5 g/m$^3$ to 10 g/m$^3$.

3. The method according to claim 1, wherein the UV irradiation takes place with radiation from low pressure radiation sources with a wavelength of 254 nm.

4. The method according to claim 1, wherein the UV irradiation takes place at a dose of 100 J/m$^2$ to 1,000 J/m$^2$.

5. The method according to claim 1, wherein the UV irradiation takes place at a dose of 250 J/m$^2$ to 400 J/m$^2$.

6. The method according to claim 2, wherein the addition of ozone takes place in a concentration of approximately 5 g/m$^3$.

7. The method according to claim 1, wherein the water exhibits before method stage a), at 254 nm, a reduced UV transmission of less than 50% related to the transmission of clean water.

8. The method according to claim 1 wherein the method comprises reducing the content of endocrinal substances in drinking water or waste water.

9. The method according to claim 1 wherein the endocrinal substances are selected from the group consisting of chlorophenols, phthalates, pesticides, phenols, chlorinated aromatics, organotin compounds, dioxins, furans, natural or nature-identical hormones, medicines, cosmetics and combinations thereof.

10. A method for treating waste water comprising:
    a) supplying waste water having a UV transmission of less than 50%, at 254 nm;
    b) introducing ozone in a concentration of 0.1 g/m$^3$ to 15 g/m$^3$ to the waste water;
    c) degasifying the waste water; and
    d) irradiating the waste water with UV radiation in a wavelength ranging from 200 nm to 300 nm, and in a dose ranging from 50 J/m$^2$ to 2,000 J/m$^2$.

11. The method of claim 10 wherein degasifying step comprises passively degasifying the waste water.

12. The method of claim 10 wherein the degasifying step comprises actively degasifying the waste water.

13. The method of claim 10 further comprising removing residual ozone from said waste water prior to the irradiating step.

* * * * *